(12) United States Patent
Martins

(10) Patent No.: US 11,220,020 B2
(45) Date of Patent: Jan. 11, 2022

(54) BLOWING DEVICE FOR A COLD-PRODUCT INTERLEAVING MACHINE

(71) Applicant: Equimatec Industria de Maquinas Ltda, Rio do Sul (BR)

(72) Inventor: Josinei Antonio Martins, Laurentino (BR)

(*) Notice: Subject to any disclaimer, the term of this patent is extended or adjusted under 35 U.S.C. 154(b) by 0 days.

(21) Appl. No.: 17/253,948

(22) PCT Filed: Aug. 2, 2019

(86) PCT No.: PCT/BR2019/050313
§ 371 (c)(1),
(2) Date: Dec. 18, 2020

(87) PCT Pub. No.: WO2020/024032
PCT Pub. Date: Feb. 6, 2020

(65) Prior Publication Data
US 2021/0268681 A1    Sep. 2, 2021

(51) Int. Cl.
| | | |
|---|---|---|
| *B26D 7/26* | (2006.01) |
| *B26F 1/44* | (2006.01) |
| *B26D 7/01* | (2006.01) |
| *B26D 7/18* | (2006.01) |
| *B26D 7/32* | (2006.01) |
| *B26D 1/14* | (2006.01) |
| *B65B 25/08* | (2006.01) |

(52) U.S. Cl.
CPC ............... *B26D 7/32* (2013.01); *B26D 1/14* (2013.01); *B65B 25/08* (2013.01)

(58) Field of Classification Search
CPC .. B26D 7/1854; B65H 35/0066; B65H 35/08; C03B 37/16; D26D 7/32; A23N 15/08; Y10T 83/0448; Y10T 83/21; Y10T 83/483; Y10T 83/207; Y10T 83/6544; Y10S 83/932
USPC ..... 83/98, 100, 23, 343, 113, 260, 348, 402, 83/950, 347, 99, 930, 730, 713, 163, 165; 99/584, 516, 540, 485, 534–536, 567; 426/518, 420

See application file for complete search history.

(56) References Cited

U.S. PATENT DOCUMENTS

| | | | | |
|---|---|---|---|---|
| 4,009,626 A | * | 3/1977 | Gressman | B26D 1/626 83/116 |
| 5,230,267 A | * | 7/1993 | Abler | B26D 7/32 426/518 |
| 5,476,037 A | * | 12/1995 | Nagaoka | A23N 15/08 99/516 |
| 5,873,291 A | * | 2/1999 | Sand | B65H 35/0066 83/260 |
| 2003/0159558 A1 | * | 8/2003 | Takayama | B26D 7/1854 83/100 |

(Continued)

FOREIGN PATENT DOCUMENTS

BR    MU89010248    1/2011

*Primary Examiner* — Ghassem Alie
(74) *Attorney, Agent, or Firm* — Scott Houtteman; Houtteman Law, LLC

(57) ABSTRACT

The present invention is a blowing device to be used in interleaver machines for cold cuts. This blowing device enables the plastic used in interleaving, responsible for separating the cold cuts, to be very thin, not folding or being mispositioned, since the device generates negative pressure between the cold cut slice and the plastic.

1 Claim, 5 Drawing Sheets

(56) References Cited

U.S. PATENT DOCUMENTS

| | | | |
|---|---|---|---|
| 2011/0277606 A1* | 11/2011 | Park | B26F 1/44 83/100 |
| 2012/0114400 A1* | 5/2012 | Wazumi | G03G 15/2028 399/323 |

* cited by examiner

BLOWING DEVICE FOR A COLD-PRODUCT INTERLEAVING MACHINE

BACKGROUND OF THE INVENTION

The present description refers to an embodiment arrangement as applied to a blowing device for use in interleaver machines for cold cuts.

The use of various cutting and interleaving forms for cold cuts is already known in the art. For interleaving, pneumatic devices are generally used, so to generate vacuum between the plastic and the cold cut.

The Brazilian document MU89010248 discloses a device with a pneumatic shaft, able to grasp the plastic spool to interleave cold cuts. Said pneumatic shaft blows the plastic towards the cold cuts, in order to perform the bonding between the cold cut slice and the plastic.

A problem concerning blowing devices for interleaving cold cuts is that the plastic performing the separation must have appropriate thickness and resistance, since, in the moment of blowing, it may fold, not being correctly lodged between the cold cut slices, causing direct contact between slices.

Another problem caused by the blowing devices for interleaving is the speed of cutting and interleaving cold cuts. The current technique is inefficient to position the plastic over recently cut slices, since it cannot be performed under high speeds, which would cause plastic misplacement and folding, even if the plastic has appropriate thickness.

Therefore, besides the process having low yield, the plastic used in interleaving must be very thick. These problems in association significantly increase the cost of the process.

In order to solve these problems, the present document discloses an embodiment arrangement as applied to blowing devices for use in interleaver machines. Said blowing device is configured to enable the plastic used in interleaving, responsible for separating the cold cuts, to be very thin, not folding or being mispositioned, since the device generates negative pressure between the cold cut slice and the plastic. This negative pressure is generated by blowing the plastic, forcing the air to travel under the plastic and over the cold cut slice, i.e. the air goes through the cold cut slice and the plastic, so that the air goes up and the plastic is then pulled against the slice. This process is performed in high speed, thus increasing yielding in comparison with the current technique.

DESCRIPTION OF THE DRAWINGS

The description of the figures will help to understand the interleaving blowing device (100).

DETAILED DESCRIPTION OF THE INVENTION

Figure 1:
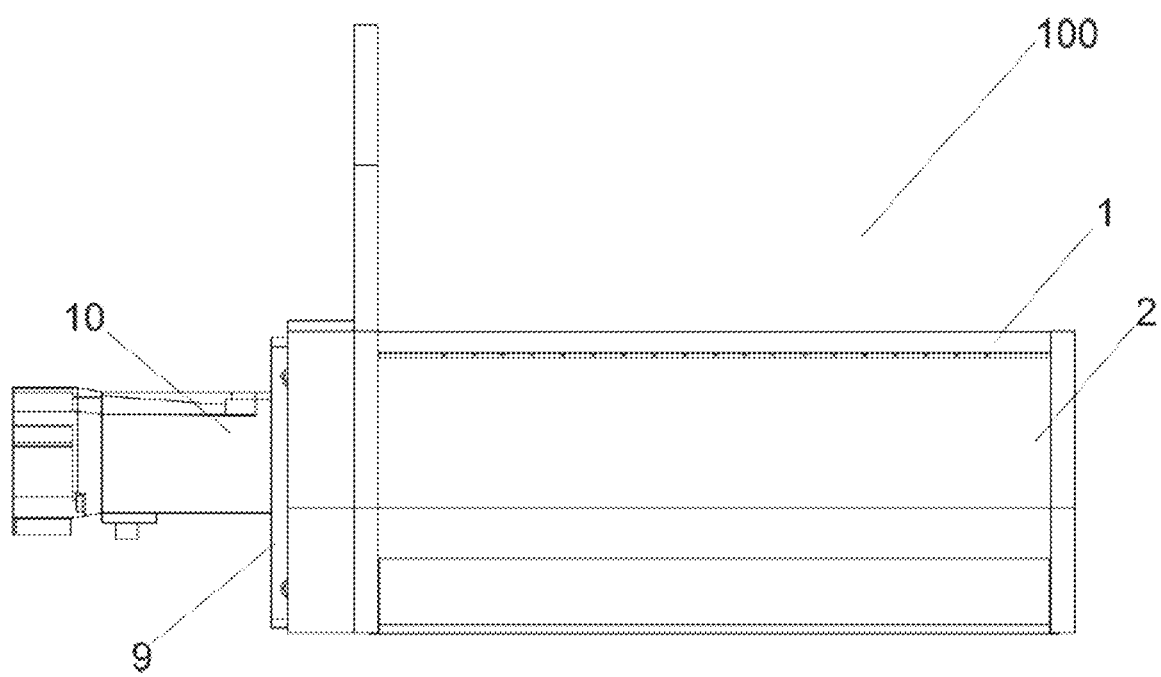
FIG. 1 illustratively shows the front view of the blowing device (100).
Figure 2:
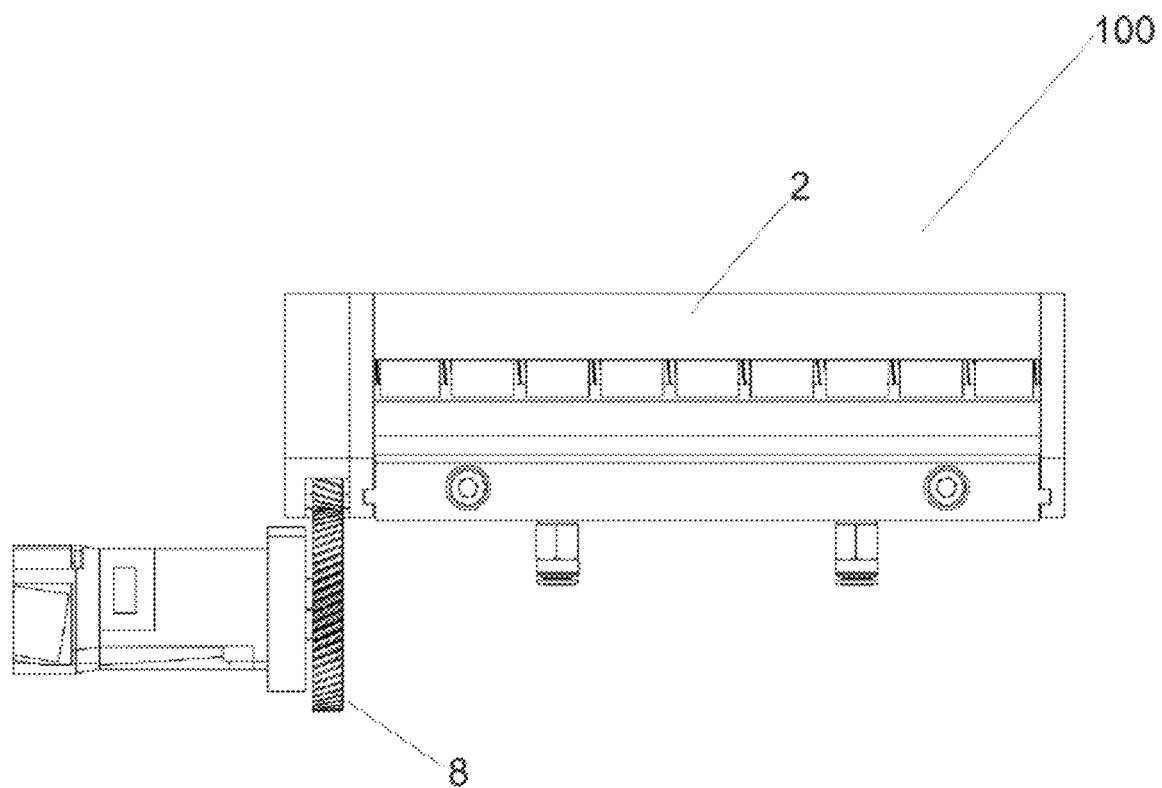
FIG. 2 illustratively shows the lower view of the blowing device (100).

With reference to the presented figures, as shown by FIG. 1, the blowing device (100) is constituted by an upper extractor (1), lower extractor (2), fixing plate (9) for the servo motor (10) per se. The servo motor (10) is responsible for moving the gear (8) as shown by FIG. 2, which moves the rubber rollers (11, 12) responsible for pulling the interleaving plastic to the position where blowing will be performed.

Figure 3:
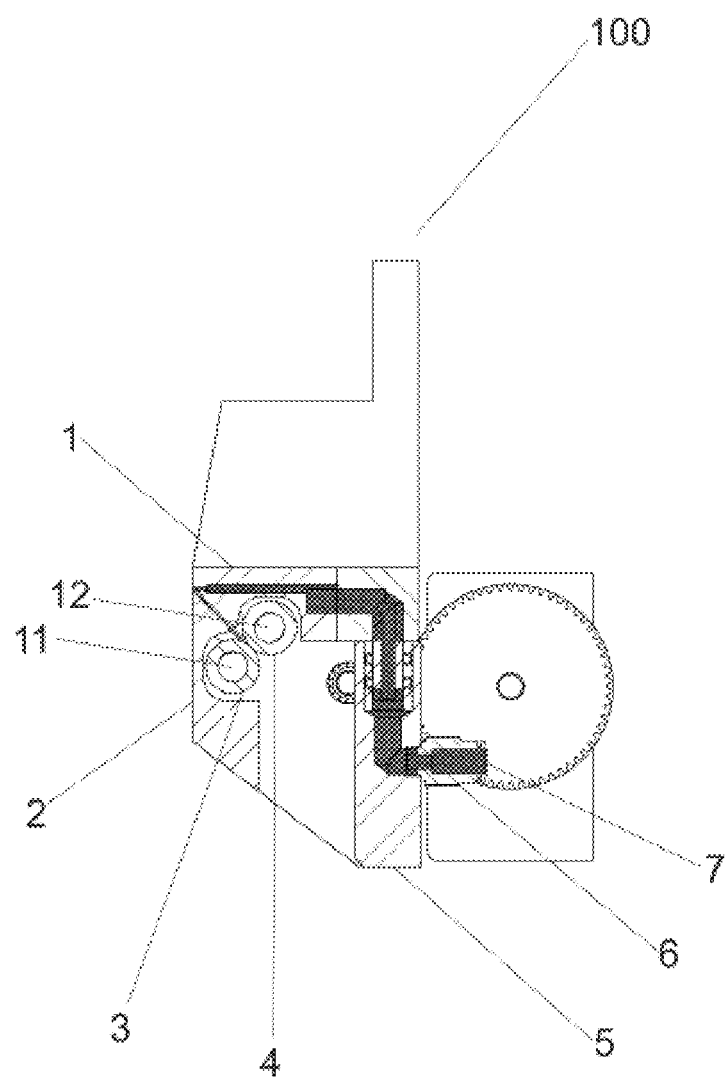
FIG. 3 illustratively shows a side cut view of the blowing device (100).

FIG. 3 shows a cut view of the blowing device (100), shown in lateral view. It shows and simplifies the whole operation of the blowing device (100). As shown, the rubber rollers (11, 12) are internally coupled to the upper extractor (1) and the lower extractor (2), which will be responsible for pulling and guiding the plastic to be used to interleave the cold cut after slicing. The pneumatic system is also shown on that Figure; the area (7) shows the route taken by the air, so that the pneumatic connection (6) is responsible for regulating the air flow; and, finally, the plate (5) which is responsible for joining and fixing the blowing device (100) to the slicer (not shown).

Figure 4:
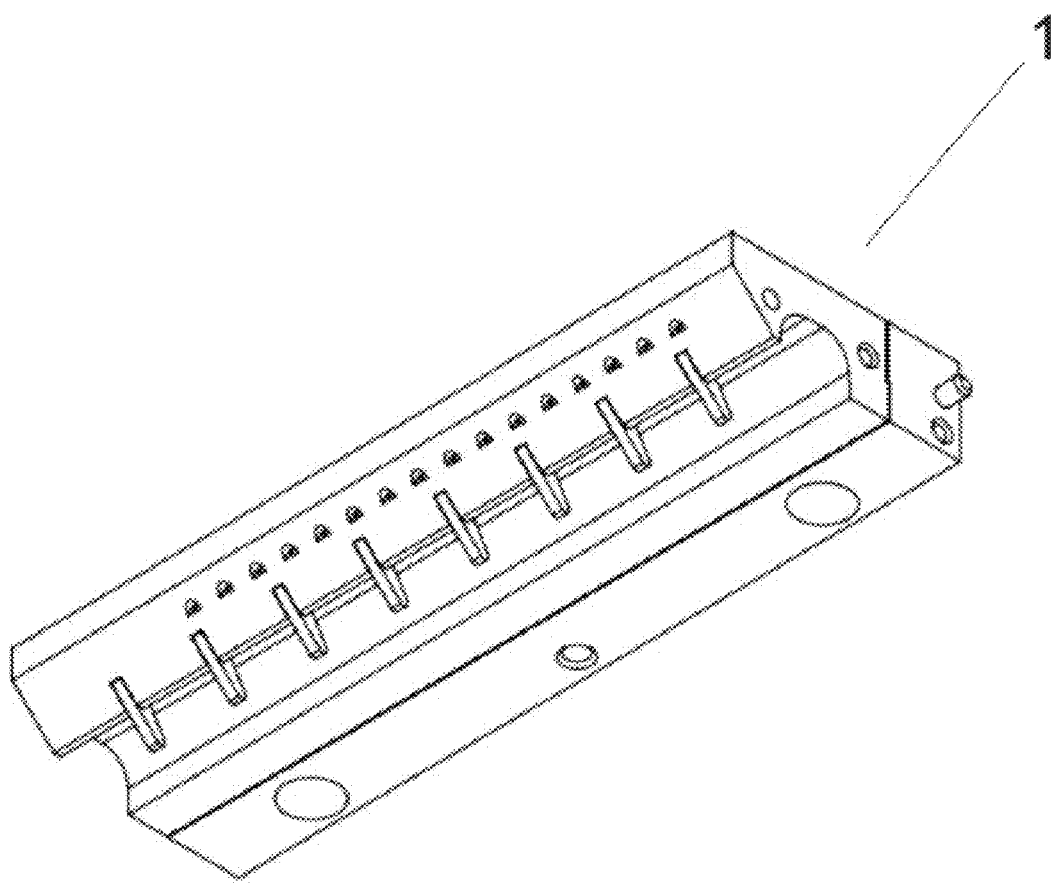
FIG. 4 illustratively shows an isometric view of the upper extractor (1), which is an integral part of the blowing device (100).
Figure 5:
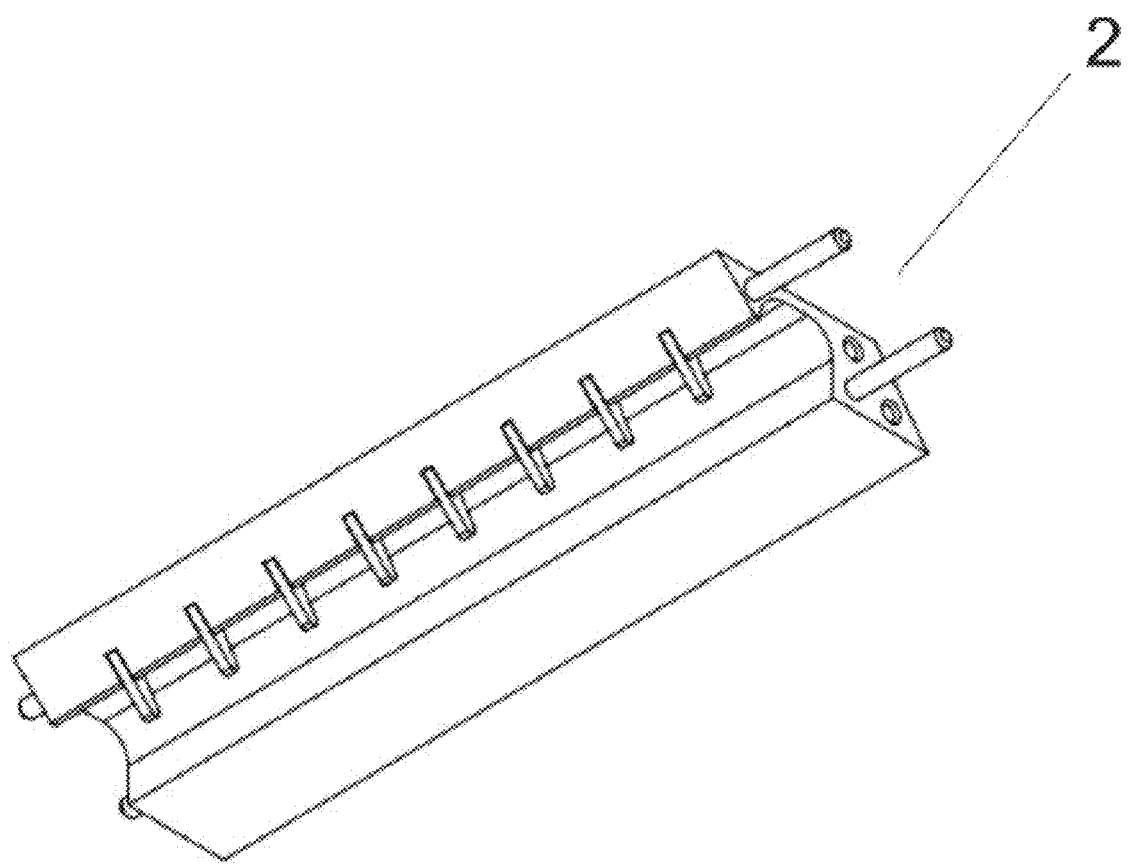
FIG. 5 illustratively shows an isometric view of the lower extractor, which is an integral part of the blowing device (100).

FIGS. 4 and 5 show the upper extractor (1) and the lower extractor (2), which are an integral part of the blowing device (100). The upper and lower extractors (1, 2) are specifically responsible for enabling the quality of interleaving the cold cuts, since their embodiment arrangement, jointly with the pneumatic connection, allows the plastic traveling through the rubber rollers (11, 12) to be guided and blown under control, so that, after the cold cut slicing, the plastic suffers negative pressure on its face to be in contact with the cold cut, thus creating a low pressure region between the plastic and the cold cut slice, causing the plastic to be correctly and quickly positioned over the cold cut slice, so to assure quality in interleaving, with no plastic folds or mispositioning. Also, high speeds are thus applied to this interleaving process, due to the used method, not influencing the quality of interleaving and keeping thin plastic thicknesses.

The blowing device (200) allows the user to make use of thinner and consequently cheaper plastics, while having perfect interleaving with high yielding against the current state of the art.

The presented disclosure should not be interpreted as a limitation, but rather as a base to understand the invented object and a representative base for the claims to teach an expert in the art how to use and put into practice the development of the proposed device, since there may be, now or in the future, other possible arrangements for conceiving the invented object, not depriving the inventive idea from its characteristics, such as e. g. a variation in the measurement of its extractors (1, 2), since, depending on the kind of machine for which the device will be used, said changes will be required to enable the blowing device as disclosed by this description to be coupled, as well as other small changes just to adapt it to the machine to be used to perform the cold cut slicing task.

The invention claimed is:

1. A blowing device (100) for a cold product interleaving machine having a cold cut slicer, comprising:
    an upper extractor (1) having an elongated body and a hook-like profile, said upper extractor including at least one internal air flow duct and at least one hole for air escape;
    a lower extractor (2) having an elongated body with a stretched shape and a hook-like shape;
    rubber rollers (11, 12),
    said rubber rollers (11, 12) being internally coupled to the blowing device (100), between the upper extractor (1) and the lower extractor (2);

an engine (10) linked to the rubber rollers (11, 12) to cause movement of the rollers;

said blowing device (100) is fixed to the cold cut slicer.

\* \* \* \* \*